UNITED STATES PATENT OFFICE.

MAX HESSENLAND, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

VAT DYESTUFFS OF THE ANTHRAQUINONE SERIES AND PROCESS OF MAKING SAME.

1,007,104.      Specification of Letters Patent.      Patented Oct. 31, 1911.

No Drawing.      Application filed March 1, 1911. Serial No. 611,577.

*To all whom it may concern:*

Be it known that I, MAX HESSENLAND, Ph. D., chemist, a citizen of the Empire of Germany, residing at Höchst-on-the-Main, Germany, have invented certain new and useful Improvements in Vat Dyestuffs of the Anthraquinone Series and Processes of Making Same, of which the following is a specification.

The 1.4-chloraminoanthraquinone may be combined with thiosalicylic acid or its derivatives so as to form the corresponding 4-aminoanthraquinonyl-1-thiosalicylic acids, which are red powders. Now, I have found that valuable dyestuffs can be obtained from these 4-aminoanthraquinonyl-1-thiosalicylic acids by treating them with dehydrating agents, such, for instance, as sulfuric acid, chlorosulfonic acid, zinc chlorid or the like. These new dyestuffs are anthraquinone-thioxanthone derivatives of the constitution:

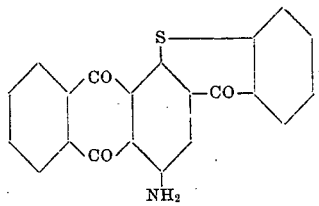

By replacing the hydrogen of the amino group by radicals, such as benzoyl, phenyl, naphthyl, anthraquinonyl, the properties of the dyestuffs can be varied.

In carrying out my invention, I may, for instance, proceed as follows: 8 parts by weight of 4-aminoanthraquinonyl-1-thiosalicylic acid are introduced at 0° C. into 100 parts of chlorosulfonic acid and the mixture is stirred for one hour at the said temperature. The mass is then gradually heated to 15–20° C. and the stirring continued until the formation of the thioxanthone is completed, which occurs after about 6–8 hours. The dyestuff is separated by pouring the mass into ice-water; it forms a blue powder, insoluble in water, alcohol and ether, soluble in hot nitrobenzene with a blue color, dissolving in alkaline hydrosulfite with reddish-blue color and dyeing cotton in the vat and by subsequent exposure to the air beautiful blue tints of excellent fastness.

Having now described my invention, what I claim is:

1. The process of producing vat dyestuffs containing sulfur, which consists in treating 4-amino-anthraquinonyl-1-thiosalicylic acid with dehydrating agents.

2. As new products, the dyestuffs containing sulfur, which are 4-aminoanthraquinone-1-thioxanthones of the constitution:

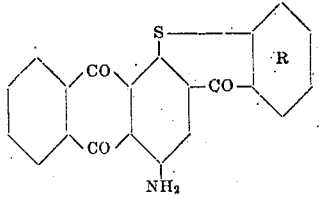

in which "R" stands for a benzene residue, being blue powders insoluble in water, alcohol and ether, soluble in alkaline hydrosulfite with a reddish-blue color and dyeing cotton fast blue tints.

3. As a new product, the 4-aminoanthraquinone-1-thioxanthone of the constitution:

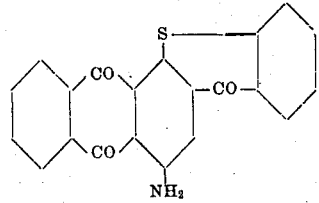

being a blue powder, insoluble in water, alcohol, ether, soluble in hot nitrobenzene with a blue color, in alkaline hydrosulfite with a reddish-blue color and dyeing cotton fast blue tints.

In testimony whereof, I affix my signature in presence of two witnesses.

MAX HESSENLAND.

Witnesses:
    JEAN GRUND,
    CARL GRUND.